(12) United States Patent
Clark

(10) Patent No.: US 11,448,940 B1
(45) Date of Patent: Sep. 20, 2022

(54) FILTER HOLDER DEVICE AND KIT

(71) Applicant: Wine Country Camera, Inc., San Clemente, CA (US)

(72) Inventor: Rodney Elliott Clark, San Clemente, CA (US)

(73) Assignee: Wine Country Camera, Inc., San Clemente, CA (US)

( * ) Notice: Subject to any disclaimer, the term of this patent is extended or adjusted under 35 U.S.C. 154(b) by 0 days.

(21) Appl. No.: 17/198,224

(22) Filed: Mar. 10, 2021

Related U.S. Application Data

(60) Provisional application No. 62/988,432, filed on Mar. 12, 2020.

(51) Int. Cl.
*G03B 11/00* (2021.01)
*G02B 7/00* (2021.01)
*G03B 17/56* (2021.01)

(52) U.S. Cl.
CPC ............. *G03B 11/00* (2013.01); *G02B 7/006* (2013.01); *G03B 17/566* (2013.01)

(58) Field of Classification Search
None
See application file for complete search history.

(56) References Cited

U.S. PATENT DOCUMENTS 4,390,242 A * 6/1983 Tatsumi ................ G03B 11/00
 396/544

FOREIGN PATENT DOCUMENTS

| CN | 208888562 U | * | 5/2019 | | |
|---|---|---|---|---|---|
| DE | 202013104541 U1 | * | 12/2013 | ............. | G03B 11/00 |
| DE | 102014013398 A1 | * | 3/2016 | ............. | G02B 7/006 |
| GB | 2523063 A | * | 8/2015 | ............. | G03B 11/00 |

OTHER PUBLICATIONS

"100mm Holder System—How To" http://www.winecountry.camera/blog/2017/6/1/holder-system-how-to (Year: 2017).*
"Introducing the Misfit Kick" https://www.youtube.com/watch?v=nNM5BCVxfcM screen captures and transcripts of relevant portions (Year: 2020).*
Submission to Request for Information Images (4 pages, 5 images).

* cited by examiner

*Primary Examiner* — Leon W Rhodes, Jr.
(74) *Attorney, Agent, or Firm* — Rutan & Tucker, LLP; Kyle M. St. James

(57) ABSTRACT

A filter holder device for a camera is disclosed that includes a frame having a first side surface, a second side surface, and an opening generally located in the center of the frame, a first filter housing present on the first side surface of the frame opening, and a second filter housing present on the second side surface of the frame opening. The first filter housing may include two housing sections configured to create one or more paired parallel slots. Each of the one or more paired parallel slots may be configured to hold in place a filter that is quadrilateral in shape. Each of the one or more paired parallel slots may include a tension spring.

20 Claims, 9 Drawing Sheets

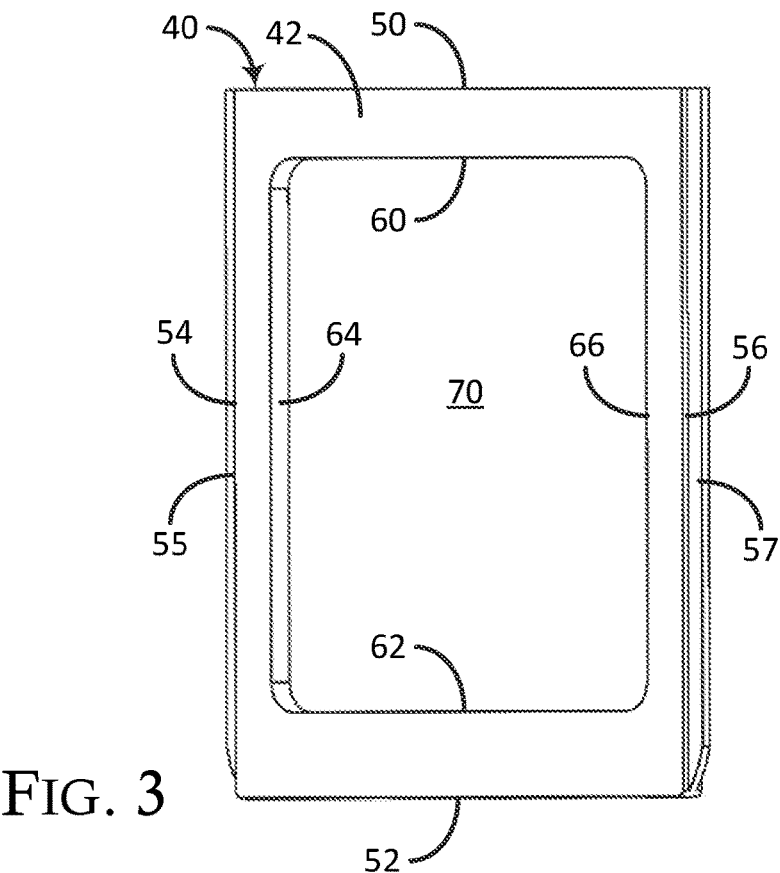
FIG. 3
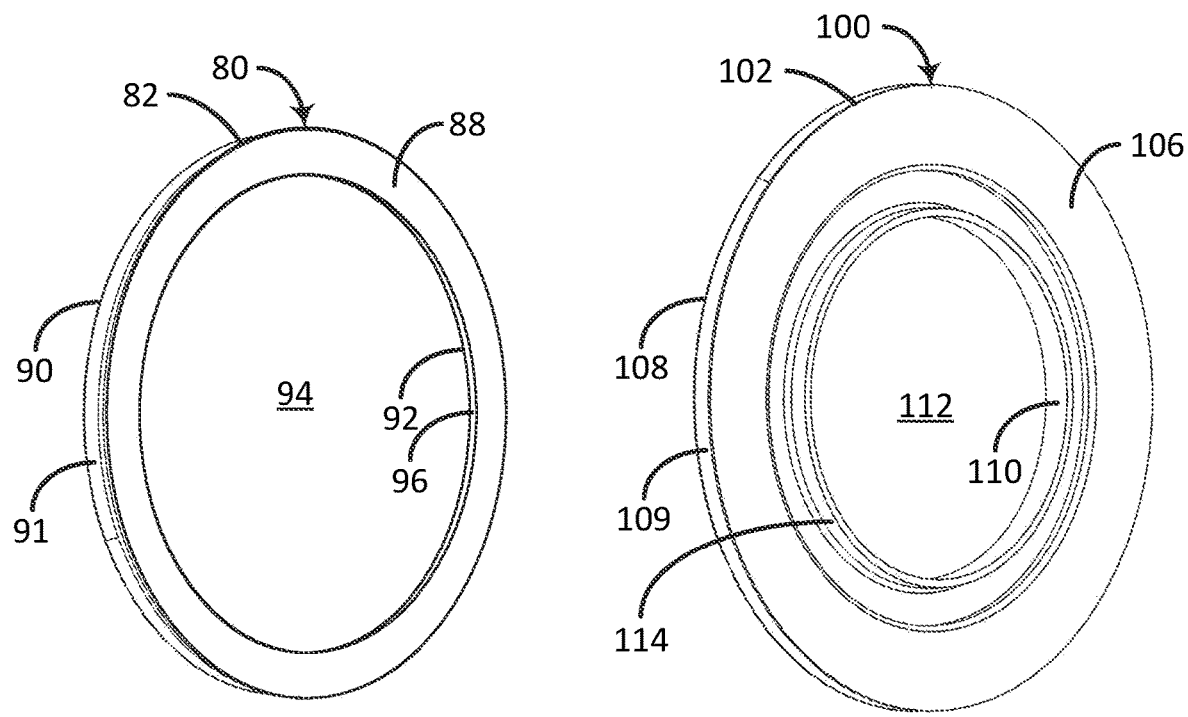
FIG. 4
FIG. 5

FILTER HOLDER DEVICE AND KIT

CROSS-REFERENCE TO RELATED APPLICATIONS

This application claims the benefit of priority to U.S. Provisional Application No. 62/988,432, filed Mar. 12, 2020, the entire contents of which are incorporated herein by reference.

FIELD

The invention relates to camera accessories used in photography and cinematography, in particular to filter holders attached to the lens of a camera, camcorder, cine camera or other video cameras.

GENERAL BACKGROUND

In photography and cinematography, a filter is a camera accessory consisting of an optical filter that can be inserted into the optical path in order to modify the image being recorded. Different filters are used in photographing or filming to achieve the picture quality desired or produce another visual or optical effect. Examples of filters include, without limitation, polarizing filters, graduated filters, neutral density filters, long-pass filters, short-pass filters, band-pass filters, absorptive filters, interference filters, dichroic filters, monochromatic filters, color balance correcting filters, color absorbing filters, contrast enhancing filters, neutral grey filters, guided-mode resonance filters, metal mesh filters, protective filters, infrared (IR) filters, and ultraviolent light (UV) filters.

A filter is secured to the front of a camera lens and can either be closed-curved in shape like a circle or oval (collectively referred to as "round") or quadrilateral in shape like a square or rectangle (collectively referred to as "square"). Round filters consist of the optical filter itself and a filter collar that can be threaded for attachment to the front of the lens. A round filter is selected based on the particular diameter of the lens and a different round filter has to be obtained for each lens diameter or for each specific type of optical filter desired for a lens diameter. Square filters consist the optical filter itself and a filter holder. While a filter holder is fitted based on the lens diameter, the optical filter itself is removable from the filter holder and can be switched with a different optical filter.

Sometimes two or more filters have to be used simultaneously during photographing or filming. To accommodate this need, filter holder devices containing one or more slots for square filters and one or more slots for round filters have been created. Generally, such a filter holder device is mounted to the camera in front of the lens and the desired filters can then be inserted into the filter holder device to produce the visual affect desired by the filter combination. Although addressing the need to secure more than one filter, current filter holder devices are still associated with unwanted faults. For example, such filter holder devices secure filters with screws making it tedious and slow to switch filters during use. Alternatively, current filter holder devices offering quick-release mechanisms for filters poorly secure the filter to the device leading to filters falling out of the device and becoming damaged upon impact. As such, there is a need for a filter holder device that safely secures a filter but still enables quick release of the filter when being replaced.

SUMMARY

Aspects of the present specification disclose a filter holder device for a camera. A disclosed filter holder device comprises a frame with a first and second side surface and a round opening generally located in the center of the frame, a first filter housing present on the first side surface of the frame opening, and a second filter housing present on the second side surface of the frame opening. A disclosed first filter housing comprises two housing sections configured to create one or more paired parallel slots, each slot configured to hold in place a filter disclosed herein that is quadrilateral in shape like a square or rectangle. The one or more parallel slots comprise a tension spring that enables a filter to be freely moved within the slot but then remain in place the desired position of the filter within the slot is achieved as well as a leaver lock assembly that fixes a filter in place when adopted into a closed or locked configuration. A disclosed second filter housing includes a filter compartment configured to hold in place a filter disclosed herein that is generally closed-curved in shape like a circle or oval. The second filter housing comprises ball bearing assemblies and a leaver lock assembly that secure a filter in place and an adjustment mechanism which allows for controlled, rotational adjustment of a filter once secured in the filter compartment.

Aspects of the present specification disclose a filter holder kit comprising a filter holder device disclosed herein, one or more filter filters, one or more second filters and optionally a camera adaptor.

BRIEF DESCRIPTION OF THE DRAWINGS

FIG. 1B illustrating a front-perspective view of a filter holder device showing a square filter housing;

FIG. 2B illustrating a back perspective view of a filter holder device showing a round filter housing;

FIG. 3 shows a front-perspective view of a first filter disclosed herein;

FIG. 4 shows a back-perspective view of a second filter disclosed herein;

FIG. 5 shows a back-perspective view of a camera adaptor disclosed herein;

FIG. 9B illustrating a front elevation view of a first leaver lock assembly of a first filter housing in a closed position;

FIG. 11B illustrating a side cross-sectional magnified view of a second filter housing showing a ball bearing assembly housing disclosed herein; FIG. 12B illustrating a side cross-sectional perspective view of a second leaver lock assembly of a second filter housing in a closed position.

DETAILED DESCRIPTION

Figure 1A:
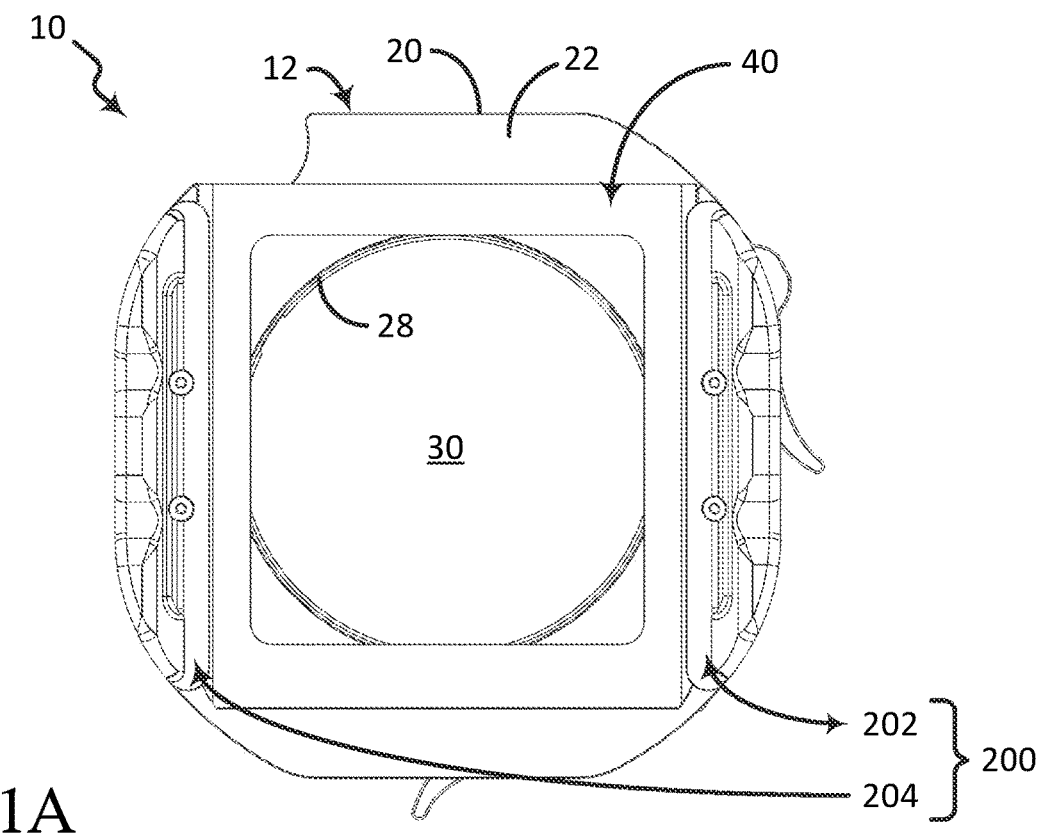
FIGS. 1A-1B show a filter holder device disclosed herein with FIG. 1A illustrating a front-elevation view of a filter holder device showing a square filter housing.
Figure 1B:
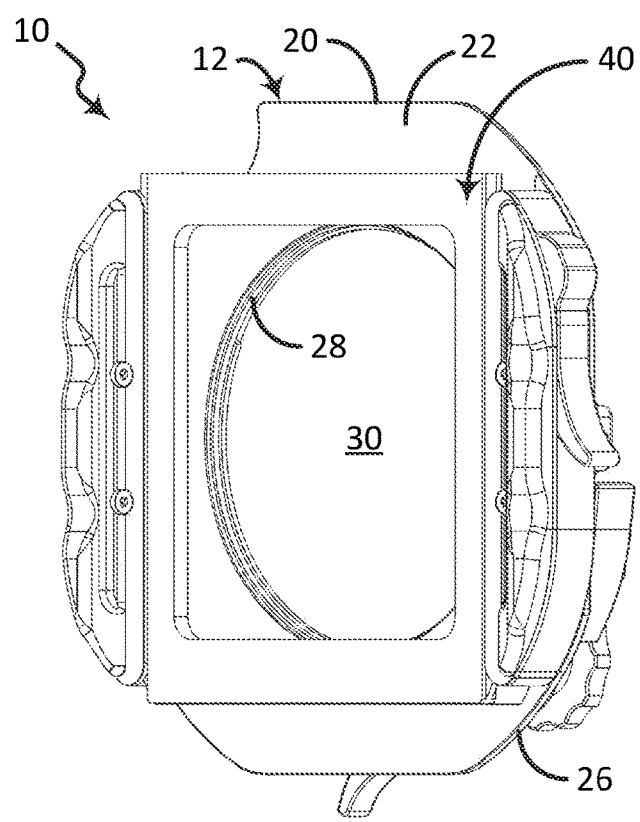

The disclosed filter holder device comprises a frame with a first and second side surface and a round opening, which in some embodiments, may be generally located in the center of the frame, one or more first filters and one or more second filters. A filter holder device disclosed herein has a size configured to hold filters used in photography and cinematography, including 100×100×2 mm filters, 100×150×2 mm filters, 150×150×2 mm filters, and 150×170×2 mm filters. In some embodiments, where a filter holder device disclosed herein is quadrilateral in shape, the overall length of a filter holder device disclosed herein is about 10 cm to about 20 cm in length. In aspects of this embodiment, the overall length of a filter holder device disclosed herein is, e.g., about 10 cm to about 12 cm in length, about 10 cm to about 15 cm in length, about 12 cm to about 15 cm in length, about 12 cm to about 17 cm in length, about 12 cm to about 18 cm in length, about 12 cm to about 20 cm in length, about 15 cm to about 17 cm in length, about 15 cm to about 18 cm in length, about 15 cm to about 20 cm in length, or about 15 cm to about 20 cm in length. In some embodiments, where a filter holder device disclosed herein is quadrilateral in shape, the overall height of a filter holder device disclosed herein is about 10 cm to about 20 cm in height. In aspects of this embodiment, the overall height of a filter holder device disclosed herein is, e.g., about 10 cm to about 12 cm in height, about 10 cm to about 15 cm in height, about 12 cm to about 15 cm in height, about 12 cm to about 17 cm in height, about 12 cm to about 18 cm in height, about 12 cm to about 20 cm in height, about 15 cm to about 17 cm in height, about 15 cm to about 18 cm in height, about 15 cm to about 20 cm in height, or about 15 cm to about 20 cm in height.

In some embodiments, where a filter holder device disclosed herein is closed-curved in shape, the overall diameter of a filter holder device disclosed herein at its longest distance is about 10 cm to about 20 cm in diameter. In aspects of this embodiment, the overall diameter of a filter holder device disclosed herein at its longest distance is, e.g., about 10 cm to about 12 cm in diameter, about 10 cm to about 15 cm in diameter, about 12 cm to about 15 cm in diameter, about 12 cm to about 17 cm in diameter, about 12 cm to about 18 cm in diameter, about 12 cm to about 20 cm in diameter, about 15 cm to about 17 cm in diameter, about 15 cm to about 18 cm in diameter, about 15 cm to about 20 cm in diameter, or about 15 cm to about 20 cm in diameter. In some embodiments, where a filter holder device disclosed herein is closed-curved in shape, the overall diameter of a filter holder device disclosed herein at its shortest distance is about 10 cm to about 20 cm in diameter. In aspects of this embodiment, the overall diameter of a filter holder device disclosed herein at its shortest distance is, e.g., about 10 cm to about 12 cm in diameter, about 10 cm to about 15 cm in diameter, about 12 cm to about 15 cm in diameter, about 12 cm to about 17 cm in diameter, about 12 cm to about 18 cm in diameter, about 12 cm to about 20 cm in diameter, about 15 cm to about 17 cm in diameter, about 15 cm to about 18 cm in diameter, about 15 cm to about 20 cm in diameter, or about 15 cm to about 20 cm in diameter.

One or more first filters of a filter holder device are generally quadrilateral in shape. In some embodiments, one or more first filters include, without limitation, 100×100×2 mm square filters, 100×150×2 mm rectangular filters, 150×150×2 mm square filters, and 150×170×2 mm rectangular filters. In some embodiments, one or more first filters include, without limitation, an absorptive filter or an interference filter. In some embodiments, one or more first filters include, without limitation, a graduated filter, a neutral density filter, a graduated neutral density filter, a long-pass filter, a short-pass filter, a band-pass filter, a clear filter, a color correction filter, a color conversion filter, a color separation (or color subtraction or color absorbing) filter, a contrast enhancement filter, a protective filter, an infrared (IR) filter, an ultraviolet light (UV) filter, a neutral grey filter, a guided-mode resonance filter, a metal mesh filter, a dichroic filter, a monochromatic filter, or special effects filter including, e.g., a graduated color filter, a cross screen filter, a diffusion and contrast reduction filter, a spot filter, a macro diopter filter, and a split diopter (split focus) filter.

One or more second filters of a filter holder device are generally closed-curved in shape. In some embodiments, one or more first filters include, without limitation, 58×2 mm round filters, 67×2 mm round filters, 72×2 mm round filters, 77×2 mm round filters, and 82×2 mm round filters. In some embodiments, one or more first filters include, without limitation, an absorptive filter or an interference filter. In some embodiments, one or more first filters include, without limitation, a polarizing filter, a graduated filter, a neutral density filter, a graduated neutral density filter, a long-pass filter, a short-pass filter, a band-pass filter, a clear filter, a color correction filter, a color conversion filter, a color separation (or color subtraction or color absorbing) filter, a contrast enhancement filter, a protective filter, an infrared (IR) filter, an ultraviolet light (UV) filter, a neutral grey filter, a guided-mode resonance filter, a metal mesh filter, a dichroic filter, a monochromatic filter, or special effects filter including, e.g., a graduated color filter, a cross screen filter, a diffusion and contrast reduction filter, a spot filter, a macro diopter filter, and a split diopter (split focus) filter.

The filter holder device disclosed herein comprises, a first filter housing present on the first side surface of the frame opening, and a second filter housing present on the second side surface of the frame opening. The first and second filter housings do not obstruct the round opening located in the frame. The first filter housing comprises two housing sections configured to create one or more paired parallel slots, each slot configured to hold in place a filter disclosed herein that is quadrilateral in shape like a square or rectangle. The one or more parallel slots comprise a tension spring that enables a filter to be freely moved within the slot but then remain in place the desired position of the filter within the slot is achieved.

The second filter housing includes a filter compartment that is generally closed-curved in shape like a circle or oval. The filter compartment is configured to hold in place a filter disclosed herein that is generally closed-curved in shape like a circle or oval. The second filter housing comprises an adjustment mechanism which allows for controlled, rotational adjustment of a filter once secured in the filter compartment.

To bring the filter holder and the filters as close as possible to the lens of a camera, and to minimize the weight of the frame and first and second filter housings while maintaining sufficient strength and rigidity, the frame and first and second filter housings are made as thin as possible. In some embodiments, a frame disclosed herein has a thickness of 2 mm to 10 mm, such as, e.g., 3 mm to 5 mm, 3 mm to 6 mm, 3 mm to 7 mm, 3 mm to 8 mm, 4 mm to 5 mm, 4 mm to 6 mm, 4 mm to 7 mm, or 4 mm to 8 mm. In some embodiments, a first filter housing disclosed herein has a thickness of 1 cm to 4 cm, such as, e.g., 1 cm to 2 cm, 1 cm to 3 cm, 1.5 cm to 2 cm, 1.5 cm to 3 cm, 1.5 cm to 4 cm, 2 cm to 3 cm, 2 cm to 4 cm, or 3 cm to 4 cm. In some embodiments, a second filter housing disclosed herein has a thickness of 1 cm to 4 cm, such as, e.g., 1 cm to 2 cm, 1 cm to 3 cm, 1.5 cm to 2 cm, 1.5 cm to 3 cm, 1.5 cm to 4 cm, 2 cm to 3 cm, 2 cm to 4 cm, or 3 cm to 4 cm.

FIGS. 1A-2B, 6 & 10 show an exemplary embodiment of a filter holder kit disclosed herein. A filter holder kit 10 comprises a filter holder device 12, a first filter 40, a second filter 80 and a camera adaptor 100.

Figure 2A:
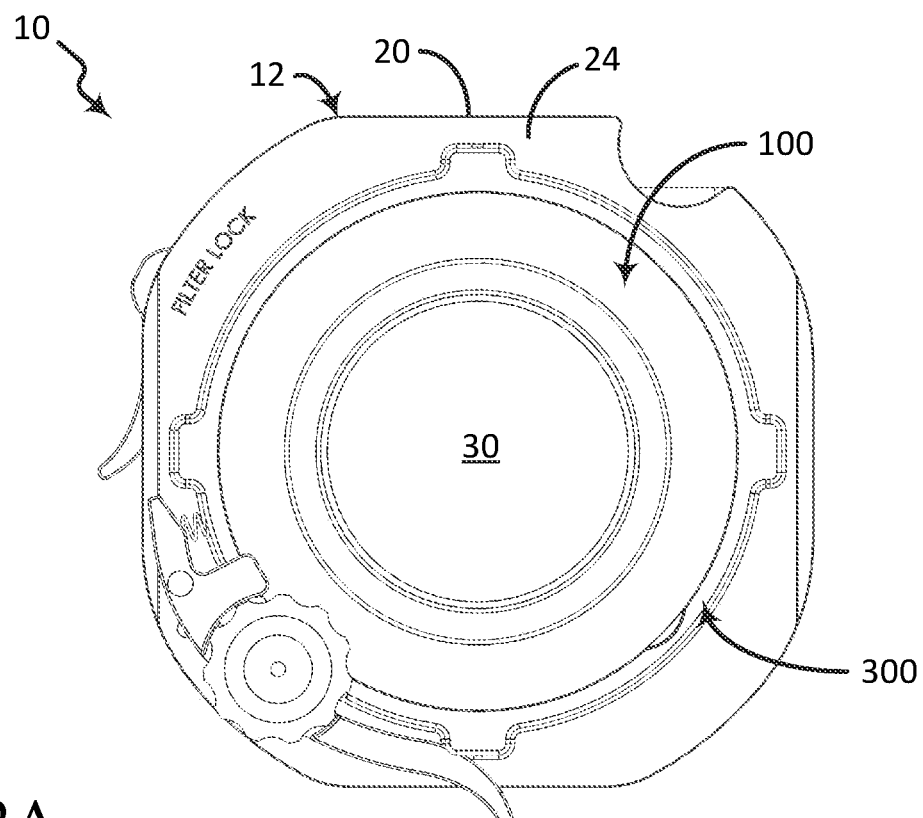
FIGS. 2A-2B show a filter holder device disclosed herein with FIG. 2A illustrating a back-elevation view of a filter holder device showing a round filter housing.
Figure 2B:
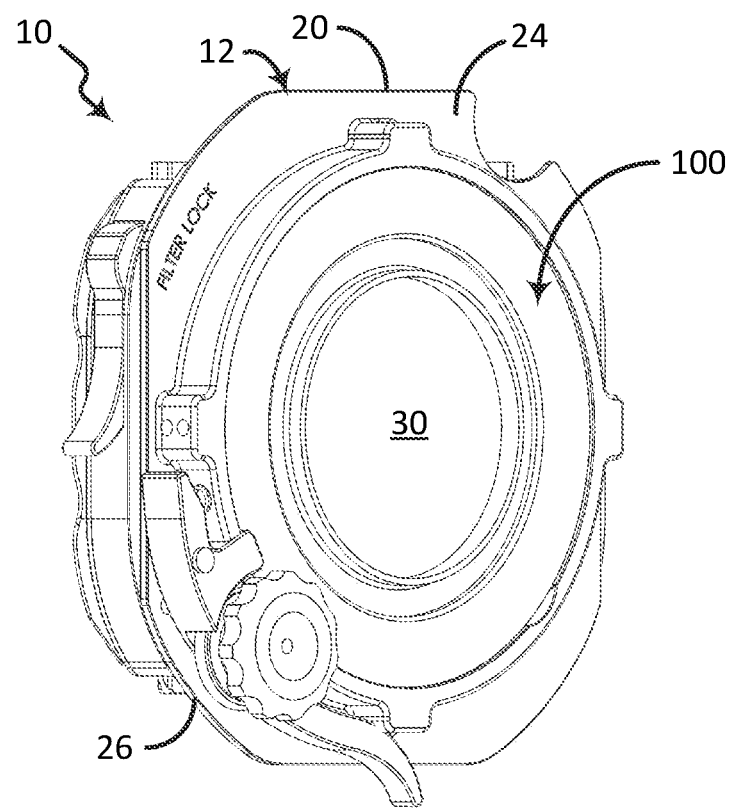
Figure 6:
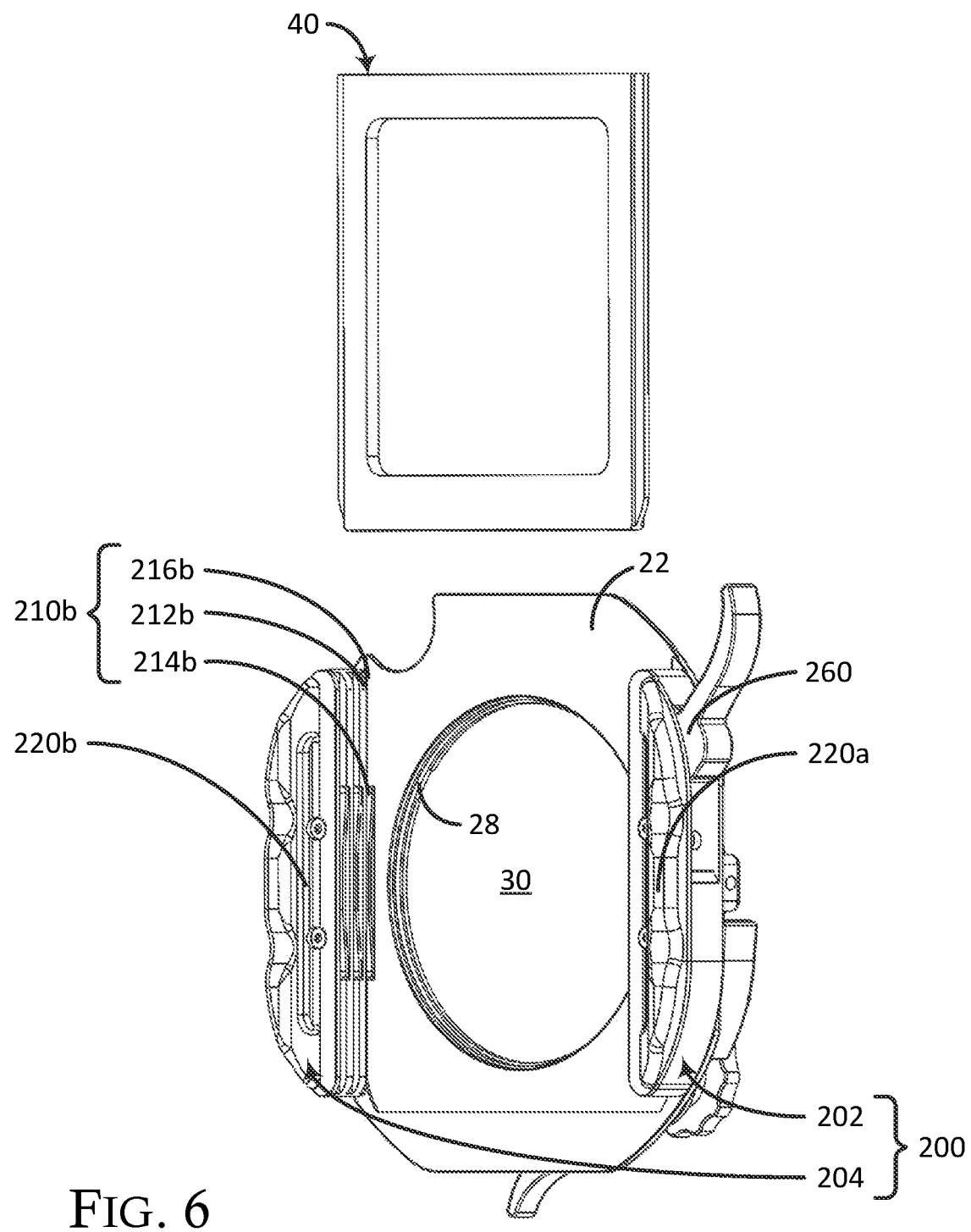
FIG. 6 shows a front-perspective exploded view of the filter holder device disclosed herein.
Figure 10:
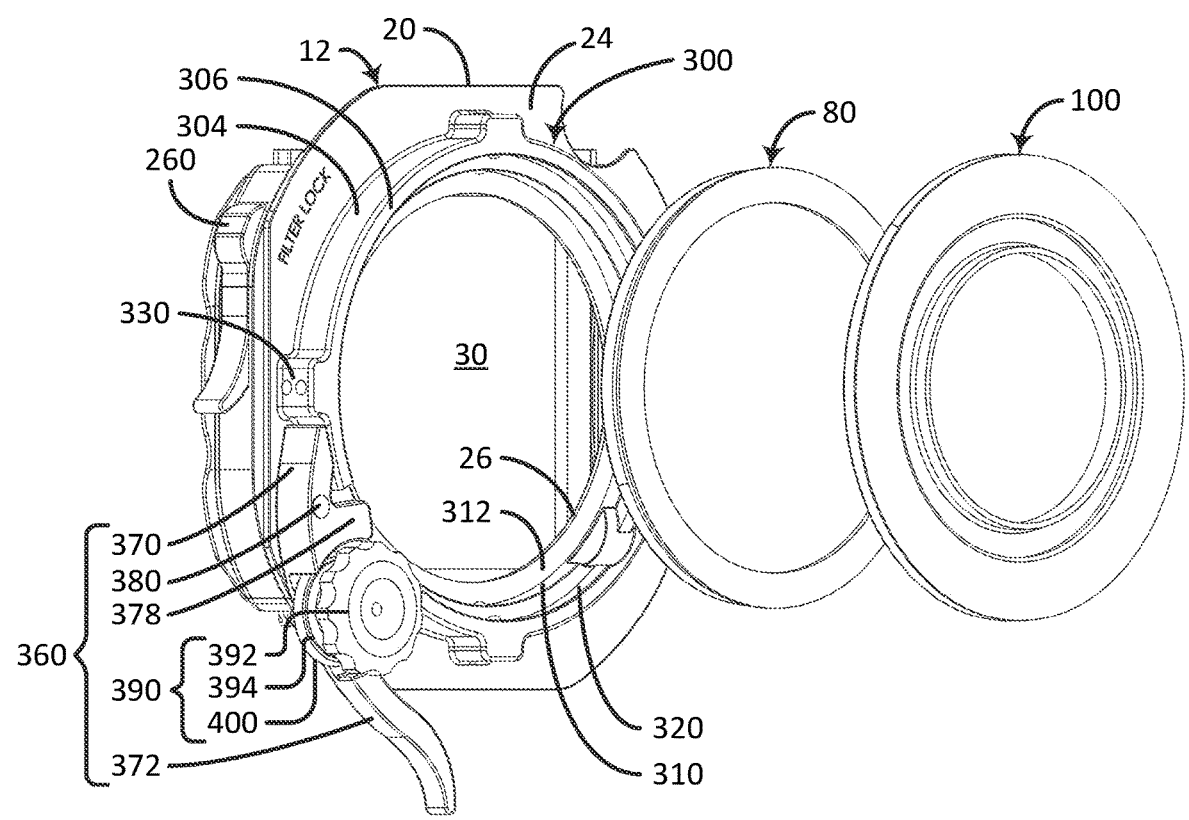
FIG. 10 shows a back-perspective exploded view of the filter holder device of FIG. 2B.

FIGS. 1A-2B, 6 & 10 show an exemplary embodiment of a filter holder device disclosed herein. A filter holder device 12 comprises a frame 20 having a first surface 22, a second surface 24, an exterior side defining the overall thickness and shape of frame 20 and an interior side 28 that is closed-curved in shape and defines opening 30 of frame 20. As best shown in FIGS. 1A-1B & 6, a first filter housing, 200 is located on first surface 22 of frame 20. As best shown in FIGS. 2A-2B & 10 a second filter housing 300 is located on second surface 24 of frame 20.

FIG. 3 shows an exemplary embodiment of a first filter disclosed herein. A first filter 40 comprises a first filter holder frame and a first optical filter (not shown). First filter frame comprises a first surface 46 (see FIG. 7) and a second surface (not shown) is quadrilateral in shape, comprising a top exterior side 50, a bottom exterior side 52, a left exterior side 54 and a right exterior side 56. Left exterior side 54 comprises a left rail 55, which runs parallel along the length of left exterior side 54. Right exterior side 56 comprises a right rail 57, which runs parallel along the length of right exterior side 56. Left rail 55 and right rail 57 can be tapered at one or both ends to facilitate placement of first filter holder 40 in first filter housing, 200. First filter frame further comprises a top interior side 60, a bottom interior side 62, a left interior side 64 and a right interior side 66 which defines an opening 70. A groove 72 defined by a top ridge 73 and a bottom ridge 74 runs through top interior side 60, bottom interior side 62, left interior side 64 and right interior side 66, grove 72 being configured to hold optical filter in place.

FIG. 4 shows an exemplary embodiment of a second filter disclosed herein. A second filter 80 comprises a second filter holder frame 82 and a second optical filter 84 (see FIG. 11B). Second filter frame 82 comprise a first surface 86 (see FIG. 11B) and a second surface 88 and is closed curved in shape, comprising an exterior side 90. Exterior side 90 comprises a concave groove 91. Second filter frame 82 further comprise an interior side 92 which defines an opening 94. A groove 96 defined by a top ridge 97 and a bottom ridge 98 runs through interior side 92, grove 96 being configured to hold optical filter 84 in place.

FIG. 5 shows an exemplary embodiment of a camera adaptor disclosed herein. A camera adaptor 100 comprises a camera adaptor frame 102 including a first surface 104 (see FIG. 11B) and a second surface 106 and is closed curved in shape, comprising an exterior side 108. Exterior side 108 comprises a concave groove 109. Camera adaptor frame 102 further comprise an interior side 110 which defines an opening 112. Along the perimeter of interior side 110, camera adaptor frame 102 extents perpendicularly from second surface 106 to form a collar 114.

FIG. 6 shows an exemplary embodiment of a first filter housing disclosed herein. A first filter housing 200 is present on first surface 22 of filter holder frame 20 and comprises a first housing section 202 and a second housing section 204. First housing section 202 comprises a first filter holding assembly 210a, a first handle assembly 220a and a first leaver lock assembly 260. Second housing section 204 comprises a second filter holding assembly 210b and a first handle assembly 220b. In some embodiments, second housing section 204 can further and optionally include a leaver lock assembly (not shown) similar to first leaver lock assembly 260.

Still referring to FIG. 6, first housing section 202 comprises a first filter holding assembly 210a including one or more filter slots 216a and second housing section 204 comprising a second filter holding assembly 210b including one or more filter slots 216b. First and second housing sections 202, 204 are orientated parallel to each other in a manner that pairs each of one or more filter slots 216a, 216b, thereby creating one or more paired filter slots, designated 216a-216b, configured to hold in place one or more filters 40 that are generally quadrilateral in shape like a square or rectangle. First and second housing sections 202, 204 are located on first surface 22 of filter holder frame 20 in a manner that does not obstruct opening 30 of frame holder frame 20.

Figure 8:
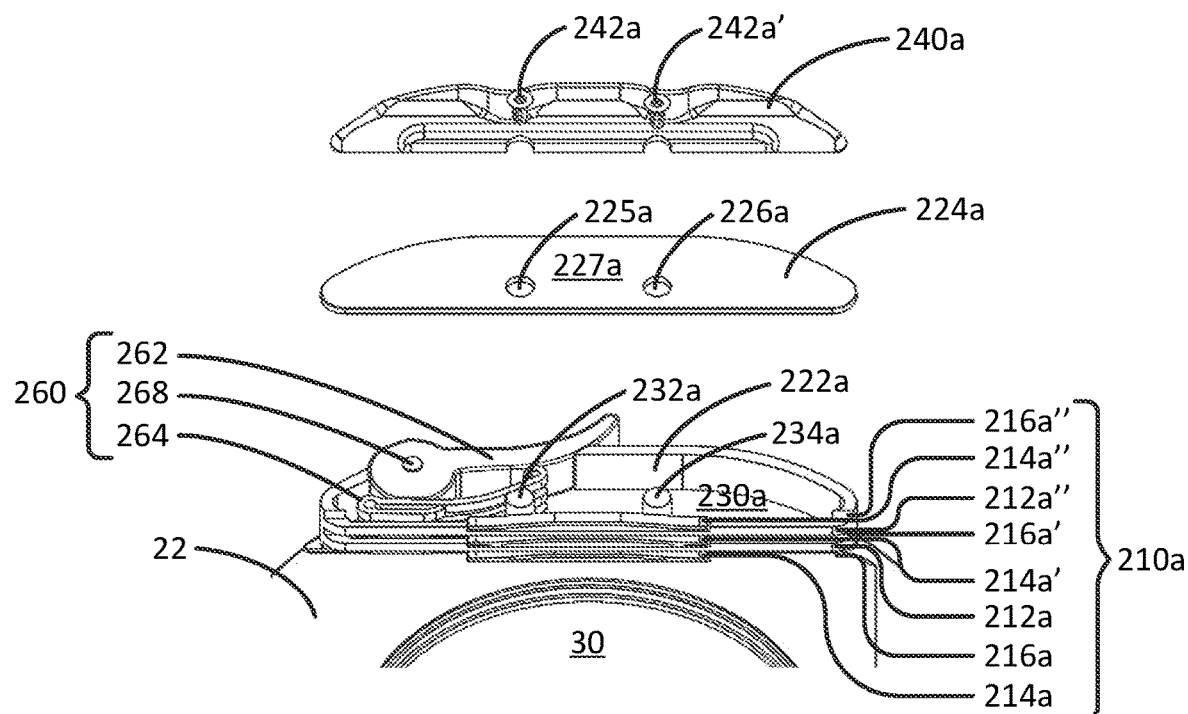
FIG. 8 shows a side perspective exploded view of the filter holder device disclosed herein illustrating a handle assembly disclosed herein.

As shown in FIG. 6, first housing section 202 also comprises a first handle holding assembly 220a and second housing section 204 also comprises a second handle holding assembly 220b. First and second handle holding assemblies 220a, 220b, and as illustrated for 220a in FIG. 8, each comprise a side 222a, 222b, which is confluent with and integrates first and second filter holding assembly 210a, 210b respectively thereby each defining an interior compartment 230a, 230b of first and second housing sections 202, 204 respectively. Interior compartments 230a, 230b each comprise one or more posts including a threaded hole. In an exemplary embodiment, and as best seen in FIG. 8, interior compartments 230a, 230b each comprise a first post 232a, 232b with threaded holes 233a, 233b and a second post 234a, 234b with threaded holes 235a, 235b. First and second handle holding assemblies 220a, 220b each further comprise a cover plate 224a, 224b configured to cover interior compartments 230a, 230b and a handle grip 240a, 240b designed to facilitate grabbing, carrying or otherwise maneuvering filter holder device 12. As best shown in FIG. 8 as illustrated for 220a, each of cover plates 224a, 224b, which includes first and second holes 225a, 226a, for cover plate 224a and first and second holes 225b, 226b for cover plate 224b, and handle grips 240a, 240b are secured to first and second handle holding assemblies 220a, 220b using screws 242a, 242b secured to threaded holes 233a, 233b of first posts 232a, 232b and threaded holes 235a, 235b of first posts 234a, 234b.

Figure 7:
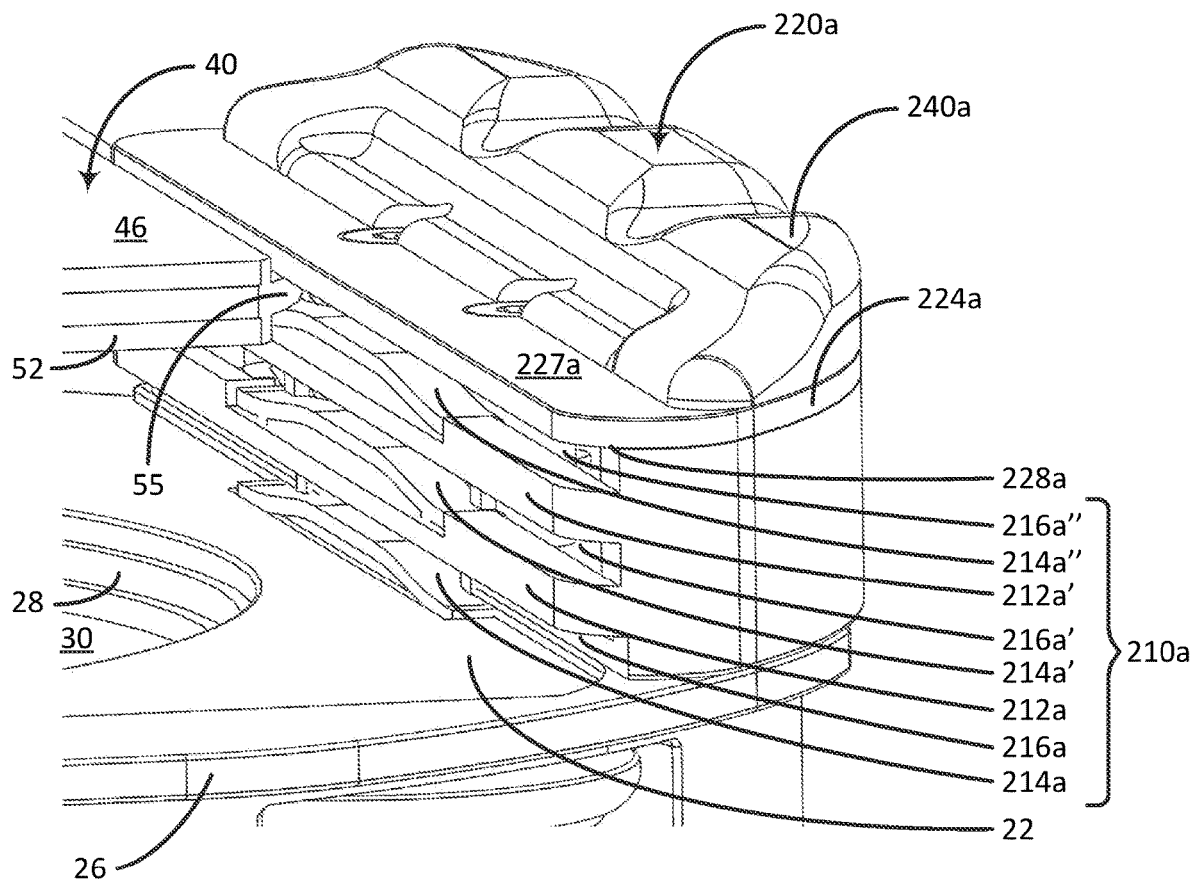
FIG. 7 shows a side-perspective view of the filter holder device disclosed herein illustrating first filter housing.

Referring now to FIGS. 6 & 7, both first filter holding assembly 210a and second filter holding assembly 210b comprise equal numbers of one or more paired filter slots 216a, 216b, respectively, each aligned and configured to secure first filter 40. Each of one or more paired filter slots 216a, 216b run parallel to each other as well as first surface 22 of filter holder frame 20 and bottom surfaces 228a, 228b of cover plates 224a, 224b of handle assemblies 220a, 220b of first and second housing sections 202, 204 respectively.

Each of one or more paired filter slots 216a, 216b comprises filter tension clips 214a, 214b respectively configured to apply mechanical pressure to left rail 55 and right rail 57 of first filter 40 in an outward direction that is substantially perpendicular to first surface 42 and a second surface on an opposite side of filter 40 of first filter 40 and in a manner that holds first filter 40 in place within paired filter slot 216a, 216b once positioned and released by a user.

Depending on the number of paired filter slots 216a-216b present in first filter housing 200, paired filter slots 216a-216b are created using different components including first surface 22 of filter holder frame 20, one or more paired filter rails 212a, 212b, and bottom surface 228 of cover plate 224 of handle assembly 220. In embodiments where first filter housing 200 is designed to secure three first filters 40, 40', 40", and referring to FIGS. 6 & 7, a first paired filter slot 216a-216b is formed using first surface 22 of filter holder frame 20 and a bottom portion of a first paired filter rails 212a, 212b, a second paired filter slot 216a'-216b' is formed using a top surface of first paired filter rails 212a, 212b, and a bottom surface of a second paired filter rails 212a', 212b', and a third paired filter slot 216a"-216b" is formed using a top surface of second paired filter rails 212a', 212b' and bottom surfaces 228a, 228b of cover plates 224a, 224b of handle assemblies 220a, 220b of first and second housing sections 202, 204 respectively.

In embodiments where first filter housing 200 is designed to secure only one first filter 40, the paired filter slot 216a-216b is formed using first surface 22 of filter holder frame 20 and bottom surfaces 228a, 228b of cover plates 224a, 224b of handle assemblies 220a, 220b of first and second housing sections 202, 204 respectively. In embodiments where first filter housing 200 is designed to secure two first filters 40, 40', a first paired filter slot 216a-216b is formed using first surface 22 of filter holder frame 20 and a bottom portion of paired filter rails 212a, 212b and a second paired filter slot 216a'-216b' is formed using a top surface of paired filter rails 212a, 212b and bottom surfaces 228a, 228b of cover plates 224a, 224b of handle assemblies 220a, 220b of first and second housing sections 202, 204 respectively.

Additional paired filter slots 216a-216b of first filter housing 200 can be created by incorporating an additional paired filter rails 212a, 212b. For example, in embodiments where first filter housing 200 is designed to secure four first filters 40, 40', 40", 40'", a first paired filter slot 216a-216b is formed using first surface 22 of filter holder frame 20 and a bottom portion of a first paired filter rails 212a, 212b, a second paired filter slot 216a'-216b' is formed using a top surface of first paired filter rails 212a, 212b, and a bottom surface of a second paired filter rails 212a', 212b', a third paired filter slot 216a"-216b" is formed using a top surface of second paired filter rails 212a', 212b', and a bottom surface of a third paired filter rails 212a", 212b", and a fourth paired filter slot 216a'-216b'" is formed using a top surface of third paired filter rails 212a", 212b" and bottom surfaces 228a, 228b of cover plates 224a, 224b of handle assemblies 220a, 220b of first and second housing sections 202, 204 respectively.

Figures 9A, 9B:
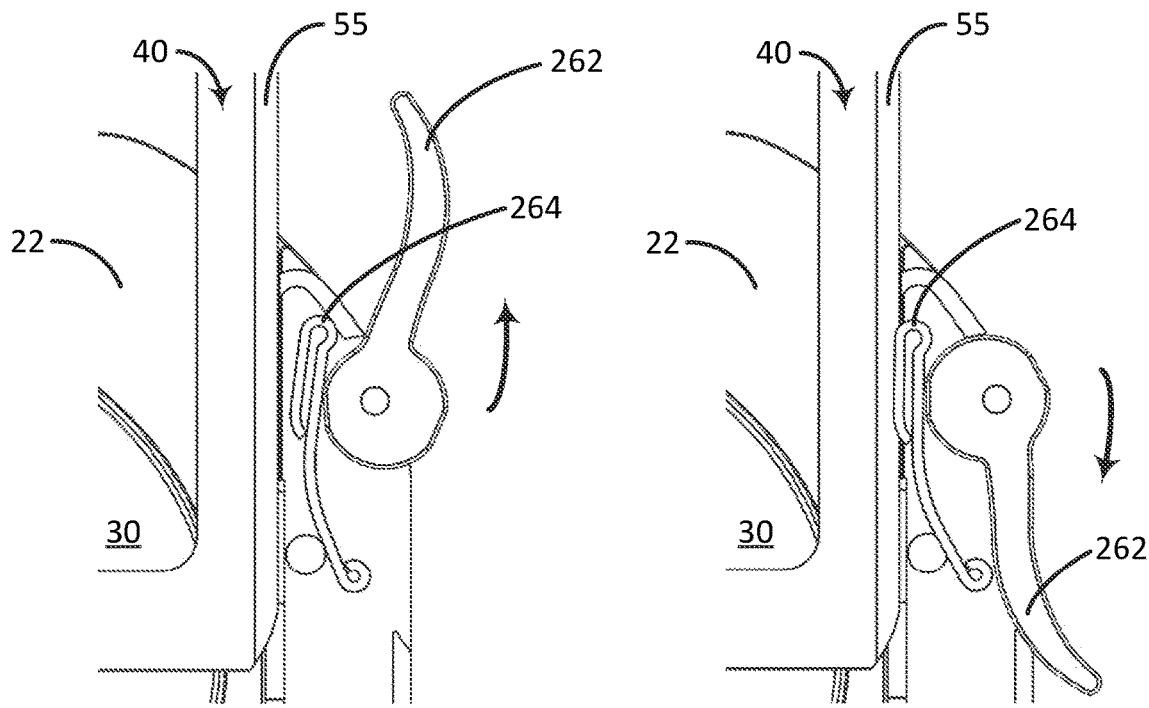
FIGS. 9A-9B show a front elevation view of the filter holder device disclosed herein with FIG. 9A illustrating a front elevation view of a first leaver lock assembly of a first filter housing in an open position.

Referring to FIGS. 6, 8 & 9A-9B, first filter holding assembly 210a also comprises first leaver lock assembly 260. As best seen in FIGS. 8 & 9A-9B, first leaver lock assembly 260 comprises a lever arm 262, a leaver arm post 268 including a threaded hole 270, a screw 272 and a tension spring clip 264. Lever arm 262 is secured to a leaver arm post 268 located in interior compartment 230a by treading screw 272 into threaded hole 270.

First leaver lock assembly 260 is designed to adopt a closed configuration (or locked configuration) or an open configuration (or unlocked configuration). In an open or unlocked configuration, as shown in FIG. 9A, movement of leaver arm 262 in an upwardly direction relieves the mechanical pressure being applied to tension spring clip 264, which in turn relieves the mechanical pressure being applied to left rail 55 and right rail 57 of first filter 40. In the open or unlocked configuration, a user can remove first filter 40 from paired filter slot 216a-216b of first filter housing 200 of filter holder device 12. In a closed or locked configuration, as shown in FIG. 9B, movement of leaver arm 262 in a downwardly direction applies mechanical pressure to tension spring clip 264, which in turn applies mechanical pressure to left rail 55 and right rail 57 of first filter 40 in an inward direction that is substantially parallel to the first surface 42 and the second surface of first filter 40 and in a manner that holds first filter 40 in place within paired filter slot 216a-216b once the closed or locked configuration is adopted.

As such, first filter housing 200 comprises two separate securing mechanism that secure first filter 40 in place when positioned in paired filter slot 216a-216b. The first securing mechanism is the mechanical pressure exerted by filter tension clips 214a, 214b against left rail 55 and right rail 57 of first filter 40 in an outward direction that is substantially perpendicular to the first surface 42 and the second surface of first filter 40. This first securing mechanism enables a user to position first filter 40 into paired filter slot 216a-216b at any point where filter tension clips 214a, 214b can apply pressure to left rail 55 and right rail 57 of first filter 40. Upon release of first filter 40 once a desired position is achieved, first filter 40 will remain in place dues to the pressure exerted by filter tension clips 214a, 214b. Once positioned, the second securing mechanism can be engaged. The second securing mechanism is the mechanical pressure exerted by tension spring clip 264 against left rail 55 and right rail 57 of first filter 40 in an inward direction that is substantially parallel to the first surface 42 and the second surface of first filter 40 when adopted in the closed or locked configuration. This second securing mechanism enables a user to fix the first filter 40 in the position desired in a manner that prevents the movement of first filter 40 during use of filter holder device 12.

FIG. 10 shows an exemplary embodiment of a second filter housing disclosed herein. A second filter housing 300 is present on second surface 24 of filter holder frame 20. Second filter housing 300 is generally closed-curved in shape and positioned in a manner that surrounds the perimeter opening 30 of frame holder frame 20 and does not obstruct opening 30. Second filter housing 300 comprises a bottom surface 302, an exterior side 304 and a top surface 306 and contains one or more ball bearing assembly housings 330 and a second leaver lock assembly 360. The interior of second filter housing 300 defines a second filter compartment 310 and a camera adaptor compartment 320. Second filter compartment 310 is generally closed-curved in shape like a circle or oval and configured to hold in place second filter 80. Camera adaptor compartment 320 is generally closed-curved in shape like a circle or oval and configured to hold in place camera adaptor 100. Camera adaptor compartment 320 is positioned on top of second filter compartment 310 and defines a closed-curved space that is generally larger than the closed-curved space defined by second filter compartment 310.

Figure 11A:
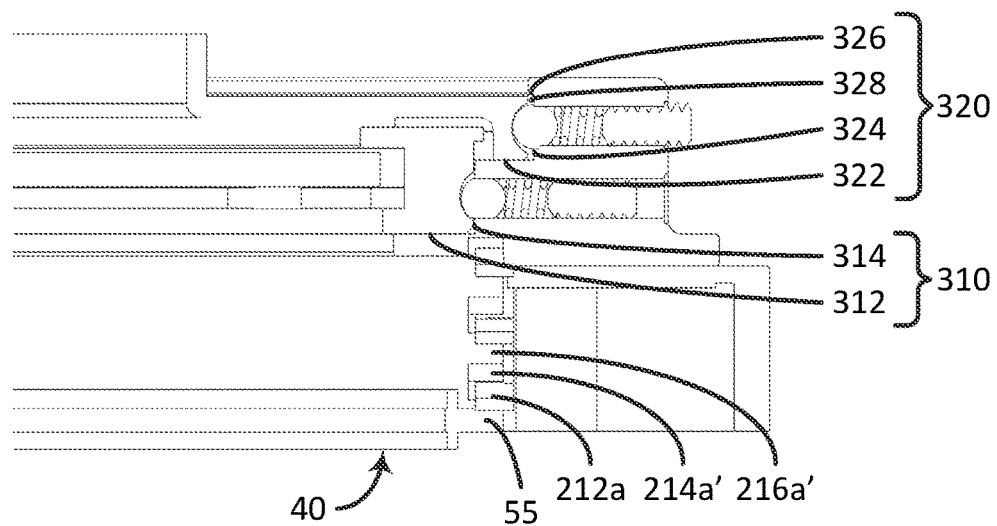
FIGS. 11A-11B show a cross-sectional view of a filter holder device disclosed herein with FIG. 11A illustrating a side cross-sectional magnified view of a second filter housing showing a second filter compartment and camera adaptor compartment disclosed herein.
Figure 12A:
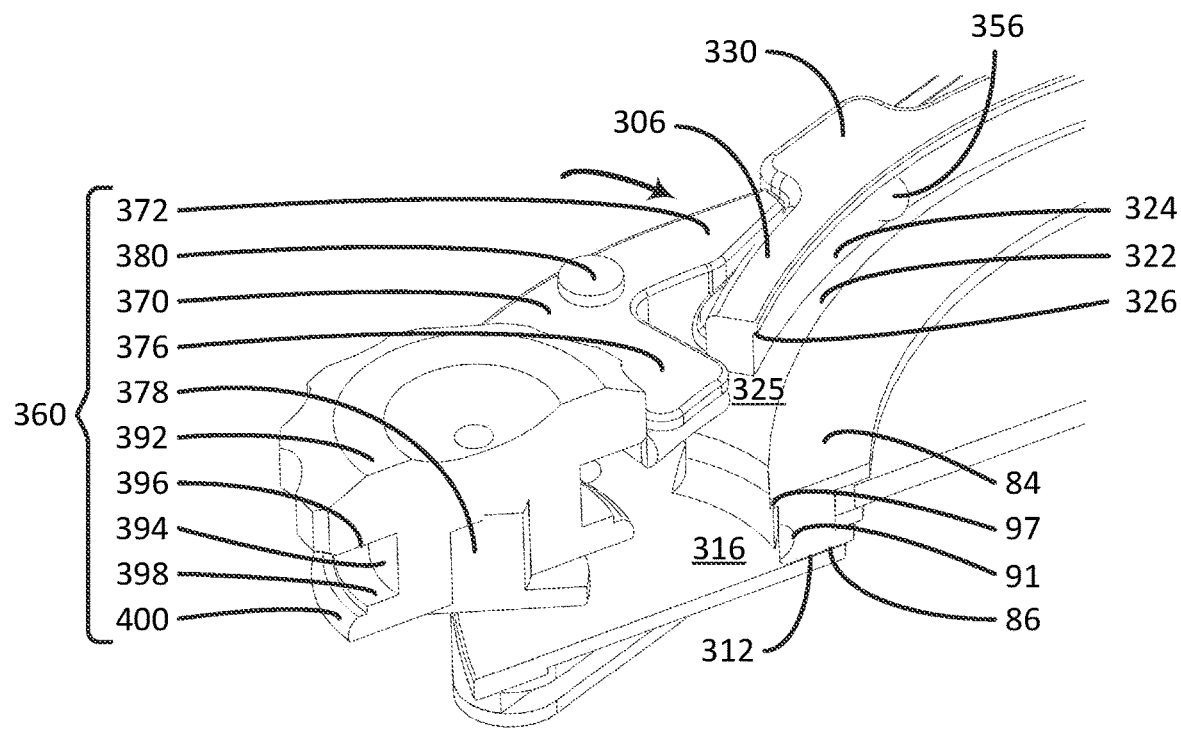
FIGS. 12A-12B show a side cross-sectional view of the filter holder device disclosed herein with FIG. 12A illustrating a side cross-sectional perspective view of a second leaver lock assembly of a second filter housing in an open position.

Referring to FIG. 11A, second filter compartment 310 comprises a bottom ridge 312 that generally conforms to the size and shape of first and second surfaces 86, 88 of second filter frame 82 and a side 314. As best seen in FIG. 12A, second filter compartment 310 also contains an opening 316 that exposes external side 90 of second filter frame 82 when positioned in second filter compartment 310. As discussed in greater detail below, opening 316 enables the engagement of leaver lock assembly 360 with external side 90 of second filter frame 82 of second filter 80.

Figure 11B:
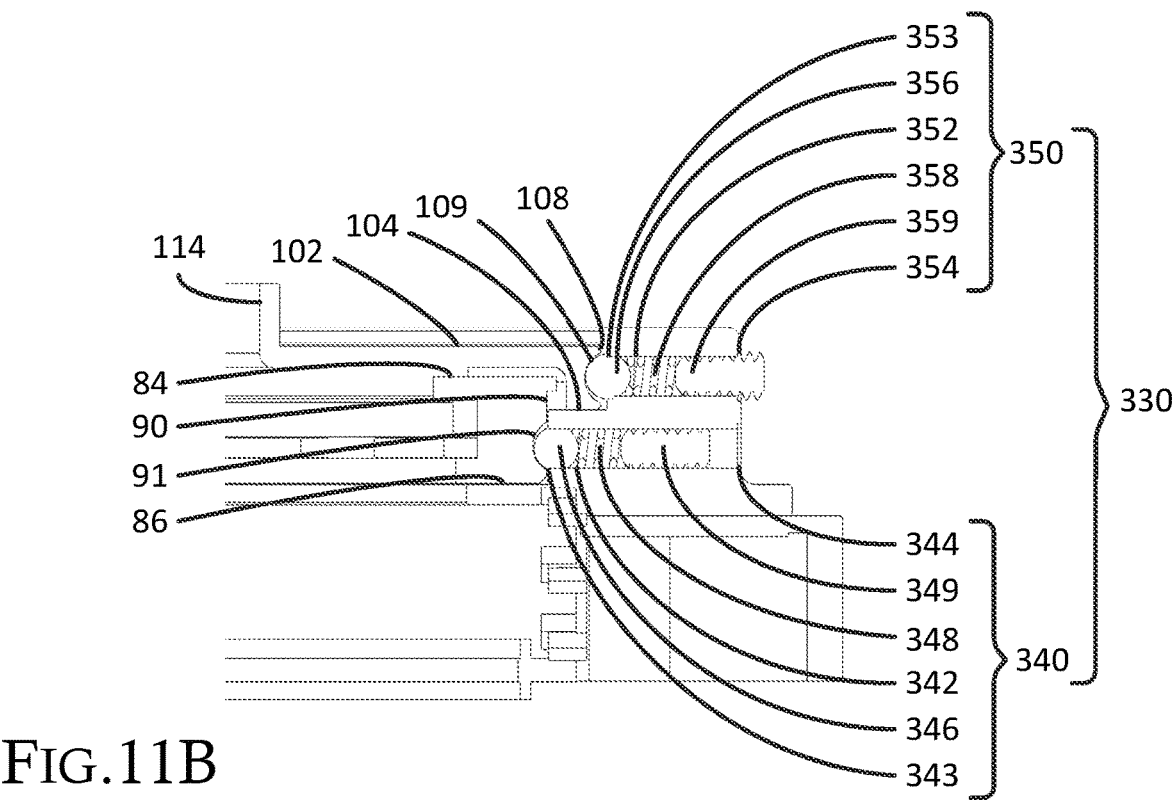

Referring to FIG. 11B, camera adaptor compartment 320 comprises a bottom ridge 322 that generally conforms to the size and shape of first surface 104 of camera adaptor frame 102 and a side 314. As best seen in FIG. 12A, camera adaptor compartment 320 also contains an opening 325 that exposes external side 108 of camera adaptor frame 102 when positioned in second filter compartment 310. As discussed in greater detail below, opening 325 enables the engagement of leaver lock assembly 360 with external side 108 of camera adaptor frame 102 of camera adaptor 100.

Referring again to FIGS. 11A-11B, second filter housing 300 comprises one or more ball bearing assembly housings 330, each of the one or more ball bearing assembly housings 330 including a ball bearing assembly 340 aligned perpendicular to side 314 of second filter compartment 310 and a ball bearing assembly 350 aligned perpendicular to side 324 of camera adaptor filter compartment 320. Referring now to FIG. 11B, ball bearing assembly 340 comprises cylinder 342 comprising an open end 343 with a ridge 344 around its circumference and open threaded end 345 opposite open end 343, and a ball bearing 345, a compression spring 348 and a set screw 349. Ball bearing 345 and compression spring 348 are captured within cylinder 342 at one end by ridge 344 of open end 343 and using set screw 349 secured to open threaded end 344, and compression spring 348 outwardly biasing ball bearing 345 toward open end 343 of cylinder 342 in a manner that causes ball bearing 345 to flexibly protrude from open end 343 of cylinder 342. So configured, ball bearing 345 protrudes from side 314 of second filter compartment 310. In operation, when second filter 80 is positioned in second filter compartment 310 each ball bearing 345 of one or more ball bearing assemblies 340 recoils into cylinder 342 due to the mechanical pressure exerted to position second filter 80 within second filter compartment 310. However, once in its final position, each ball bearing 345 of one or more ball bearing assemblies 340 protrudes from side 314 of second filter compartment 310 in a manner that engages each ball bearing 345 into groove 91 of side 90 of second filter frame 82. This engagement is configured to apply mechanical pressure to groove 91 of side 90 of second filter frame 82 in an inward direction that is substantially parallel to first and second surfaces 86, 88 of second filter 80 and in a manner that holds second filter 80 in place within second filter compartment 310 once positioned and released by a user.

Referring now to FIG. 11B, ball bearing assembly 350 comprises cylinder 352 comprising an open end 353 with a ridge 354 around its circumference and open threaded end 355 opposite open end 353, and a ball bearing 355, a compression spring 358 and a set screw 359. Ball bearing 355 and compression spring 358 are captured within cylinder 352 at one end by ridge 354 of open end 353 and using set screw 359 secured to open threaded end 354, and compression spring 358 outwardly biasing ball bearing 355 toward open end 353 of cylinder 352 in a manner that causes ball bearing 355 to flexibly protrude from open end 353 of cylinder 352. So configured, ball bearing 355 protrudes from side 324 of camera adaptor compartment 320. In operation, when camera adaptor 100 is positioned in camera adaptor compartment 320 each ball bearing 355 of one or more ball bearing assemblies 350 recoils into cylinder 352 due to the mechanical pressure exerted to position camera adaptor 100 within camera adaptor compartment 320. However, once in its final position, each ball bearing 355 of one or more ball bearing assemblies 350 protrudes from side 324 of camera adaptor compartment 320 in a manner that engages each ball bearing 355 into groove 109 of side 108 of camera adaptor frame 102. This engagement is configured to apply mechanical pressure to groove 109 of side 108 of camera adaptor frame 102 in an inward direction that is substantially parallel to first and second surfaces 104, 106 of camera adaptor 100 and in a manner that holds camera adaptor 100 in place within camera adaptor compartment 320 once positioned and released by a user.

Figure 12B:
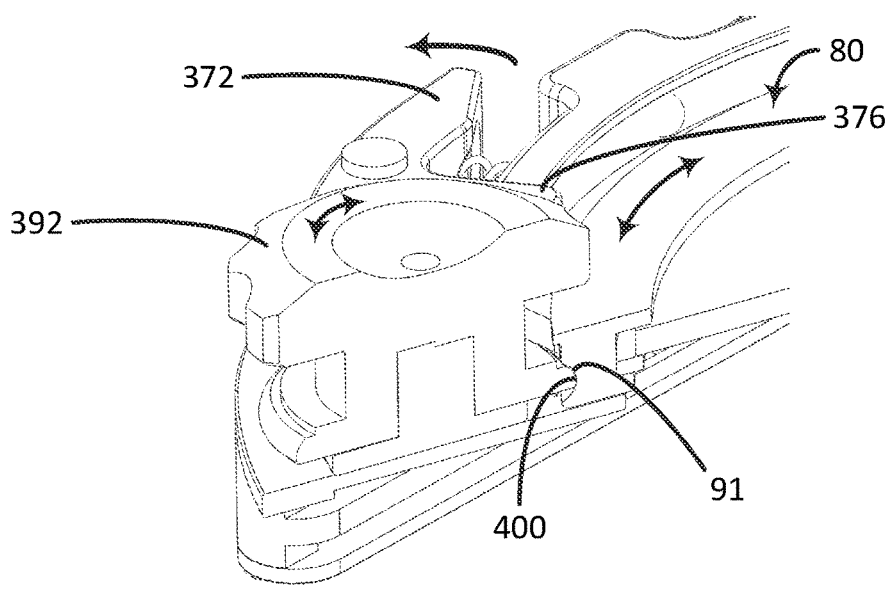

Referring to FIGS. 10 & 12A-12B, second filter housing 300 also comprises second leaver lock assembly 360. As best seen in FIG. 12A, second leaver lock assembly 360 comprises a body 370 including a securing pin hole 380, a lever arm 372 containing a spring housing (not shown) including a compression spring 382, a camera adaptor stop 376, an adjustment knob post 378 including a threaded hole 379, and an adjustment knob 390 including a knob 392, a groove 394 with top ridge 396 and bottom ridge 398, and a convex portion 400. Second leaver lock assembly 360 is secured to second surface 24 of filter holder frame 20 using securing pin 380. Compression spring 382 has one end seated in spring housing 374 and the other end seated in spring seat (not shown) of exterior side of second filter housing 300. Adjustment knob 390 is secured to adjustment knob post 378 using screw 402 secured adjustment knob post 378 using threaded hole 379.

Second leaver lock assembly 360 is designed to adopt a closed configuration (or locked configuration) or an open configuration (or unlocked configuration). In an open or unlocked configuration, as shown in FIG. 12A, movement of leaver arm 372 in an inward direction toward second filter housing 300 relieves the mechanical pressure being applied by convex portion 400 of adjustment knob 390 to groove 91 of exterior side 90 of second filter frame 82 as well as disengagement of camera adaptor stop 376 from above second surface 106 of camera adaptor frame 102. In the open or unlocked configuration, a user can remove camera adaptor 100 and second filter 80 from filter holder device 12.

In a closed or locked configuration, as shown in FIG. 12B, movement of leaver arm 372 in an outwardly direction away from second filter housing 300 engages convex portion 400 of adjustment knob 390 with groove 91 of exterior side 90 of second filter frame 82 in a manner that applies mechanical pressure in an inward direction against groove 91 of exterior side 90 of second filter frame 82 and holds second filter 80 in place within second filter compartment 310 once the closed or locked configuration is adopted. Furthermore, in a closed or locked configuration, as shown in FIG. 12B, movement of leaver arm 372 in an outwardly direction away from second filter housing 300 positions camera adaptor stop 376 over second surface 106 of camera adaptor frame 102 in a manner that provides a physical barrier that holds camera adaptor 100 in place within camera adaptor compartment 320 once the closed or locked configuration is adopted.

As such, second filter housing 300 comprises two separate securing mechanisms that secure second filter 80 in place when positioned within second filter compartment 310 and secure camera adaptor 100 in place when positioned within camera adaptor compartment 320. The first securing mechanism is the mechanical pressure exerted by one or more ball bearing assemblies 340 in an inward direction against groove 91 of exterior side 90 of second filter frame 82 as well as the mechanical pressure exerted by one or more ball bearing assemblies 350 in an inward direction against groove 109 of side 108 of camera adaptor frame 102. This first securing mechanism enables a user to safely position second filter 80 within second filter compartment 310 and then safely position camera adaptor 100 within camera adaptor compartment 320. Once positioned, the second securing mechanism can be engaged. The second securing mechanism is the mechanical pressure exerted by convex portion 400 of adjustment knob 390 in an inward direction against groove 91 of exterior side 90 of second filter frame 82 as well as the physical barrier created by camera adaptor stop 376 over second surface 106 of camera adaptor frame 102. This second securing mechanism enables a user to secure the second filter 80 and camera adaptor 100 in a manner that prevents second filter 80 and camera adaptor 100 from falling out during use of filter holder device 12.

In addition to securing second filter 80 within second filter compartment 310, when in the closed or locked configuration, adjustment knob 390 enables adjustment mechanism which allows for controlled, rotational adjustment of second filter 80 once secured in second filter compartment 310. In operation, a user turns adjustment knob 390 by moving knob 392 in a clock-wise or counter clock-wise direction which simultaneously turns convex portion 400. This in turn rotates second filter 80 within second filter compartment 310 due to the friction created between convex portion 400 and groove 91 of exterior side 90 of second filter frame 82 because of the mechanical pressure being applied in an inward direction against groove 91 of exterior side 90 of second filter frame 82 second leaver lock 360 is in the closed configuration.

In closing, it is to be understood that although aspects of the present specification are highlighted by referring to specific embodiments, one skilled in the art will readily appreciate that these disclosed embodiments are only illustrative of the principles of the subject matter disclosed herein. It is not intended to be exhaustive or to limit the invention to the precise forms disclosed. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the scope of the invention is not to be limited by this detailed description. Furthermore, it is intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising," variations thereof such as "comprise" and "comprises," and equivalent open-ended transitional phrases thereof like "including," "containing" and "having," encompasses all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as "consist of" "consists of" "consist essentially of," and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

Lastly, the terminology used herein is for the purpose of describing particular embodiments only and is not intended to limit the scope of the present invention, which is defined solely by the claims. Accordingly, the present invention is not limited to that precisely as shown and described.

The invention claimed is:

1. A filter holder device for a camera, the filter holder device comprising:
   a frame, the frame having a first side surface, a second side surface, and a frame opening;
   a first filter housing into which a first filter may be positioned present on the first side surface of the frame opening; and
   a second filter housing present on the second side surface of the frame opening;
   wherein the first filter housing comprises:
      a first securing mechanism comprising a first spring configured to apply a first pressure in a first direction to the first filter when the first filter is mounted in the first filter housing, and
      a second securing mechanism comprising a second spring configured to selectively apply a second pressure in a second direction to the first filter mounted in the first filter housing, the second direction being different than the first direction; and
   wherein the first pressure applied by first securing mechanism allows a user to freely position the first filter within the first filter housing but holds the first filter in place when the filter is released by the user, and the second securing mechanism fixes the first filter in place when the second pressure is applied.

2. The filter holder device of claim 1, wherein the first filter housing comprises two housing sections configured to create one or more paired parallel slots.

3. The filter holder device of claim 2, wherein each of the one or more paired parallel slots is configured to hold in place a first filter that is quadrilateral in shape.

4. The filter holder device of claim 3, wherein the first spring comprises a tension spring in each of the one or more paired parallel slots.

5. The filter holder device of claim 1, wherein the second securing mechanism comprises a leaver lock assembly configured to adopt a closed configuration and an opened configuration.

6. The filter holder device of claim 1, wherein the second filter housing includes (i) a filter compartment configured to hold in place a second filter and (ii) a camera adaptor compartment configured to hold in place a camera adaptor.

7. The filter holder device of claim 6, wherein the filter compartment is closed-curved in shape.

8. The filter holder device of claim 6, wherein the camera adaptor compartment is closed-curved in shape.

9. The filter holder device of claim 6, wherein the second filter housing comprises (i) leaver lock assembly that secure a filter in place and (ii) an adjustment mechanism configured for controlled, rotational adjustment of the filter once secured in the filter compartment.

10. The filter holder device of claim 1, wherein the first direction is orthogonal to the second direction.

11. The filter holder device of claim 1, wherein the first direction is perpendicular to the first side surface of the frame and the second direction is parallel with the first side surface of the frame.

12. A filter holder kit comprising:
a filter holder device for a camera including:
  a frame, the frame having a first side surface, a second side surface, and a frame opening;
  a first filter housing into which a first filter may be positioned present on the first side surface of the frame opening; and
a second filter housing present on the second side surface of the frame opening; and one or more first filters configured to be positioned in the first filter housing;
wherein the first filter housing comprises:
  a first securing mechanism comprising a first spring configured to apply a first pressure in a first direction to the first filter when the first filter is mounted in the first filter housing, and
  a second securing mechanism comprising a second spring configured to selectively apply a second pressure in a second direction to the first filter mounted in the first filter housing, the second direction being different than the first direction; and
wherein the first pressure applied by first securing mechanism allows a user to freely position the first filter within the first filter housing but holds the first filter in place when the filter is released by the user, and the second securing mechanism fixes the first filter in place when the second pressure is applied.

13. The filter holder kit of claim 12, further comprising: one or more second filters configured to be positioned in the second filter housing.

14. The filter holder kit of claim 12, wherein the first filter housing comprises two housing sections configured to create one or more paired parallel slots.

15. The filter holder kit of claim 14, wherein each of the one or more paired parallel slots is configured to hold in place a first filter that is quadrilateral in shape.

16. The filter holder kit of claim 15, wherein the first spring comprises a tension spring in each of the one or more paired parallel slots.

17. The filter holder kit of claim 12, wherein the second securing mechanism comprises a leaver lock assembly configured to adopt a closed configuration and an opened configuration.

18. The filter holder kit of claim 12, wherein the second filter housing includes (i) a filter compartment configured to hold in place a second filter and (ii) a camera adaptor compartment configured to hold in place a camera adaptor.

19. The filter holder kit of claim 12, wherein the first direction is orthogonal to the second direction.

20. The filter holder kit of claim 12, wherein the first direction is perpendicular to the first side surface of the frame and the second direction is parallel with the first side surface of the frame.

* * * * *